United States Patent
Clark et al.

(10) Patent No.: US 7,296,834 B2
(45) Date of Patent: Nov. 20, 2007

(54) AIR-POWERED VACUUM TOOL FOR HANDLING MULTIPLE WORKPIECES

(75) Inventors: Jeffrey A. Clark, Adrian, MI (US);
William A. Frank, Onstead, MI (US);
Richard M. Harrington, Cincinnatti, OH (US); Salahuddin F. Khan, Manitou Beach, MI (US)

(73) Assignee: Aidco International, Inc., Adrian, MI (US)

( * ) Notice: Subject to any disclaimer, the term of this patent is extended or adjusted under 35 U.S.C. 154(b) by 245 days.

(21) Appl. No.: 10/711,942

(22) Filed: Oct. 14, 2004

(65) Prior Publication Data
US 2006/0082172 A1 Apr. 20, 2006

(51) Int. Cl.
*B25J 15/06* (2006.01)
(52) U.S. Cl. .......................................... 294/65; 901/40
(58) Field of Classification Search ............... 294/64.1, 294/64.2, 65; 414/627, 737, 752.1, 752; 901/40
See application file for complete search history.

(56) References Cited

U.S. PATENT DOCUMENTS

| | | | | | |
|---|---|---|---|---|---|
| 2,572,640 | A | * | 10/1951 | Lovegrove | 248/363 |
| 2,903,290 | A | * | 9/1959 | Morris et al. | 294/65 |
| 3,062,578 | A | * | 11/1962 | Bushong | 294/65 |
| 3,498,663 | A | * | 3/1970 | Cantrill | 294/65 |
| 3,933,388 | A | * | 1/1976 | Conboy | 294/64.1 |
| 5,024,575 | A | * | 6/1991 | Anderson | 414/627 |
| 5,387,068 | A | * | 2/1995 | Pearson | 414/404 |
| 5,609,377 | A | * | 3/1997 | Tanaka | 294/65 |
| 6,641,131 | B2 | * | 11/2003 | Stohr et al. | 271/91 |

* cited by examiner

*Primary Examiner*—Dean J Kramer
(74) *Attorney, Agent, or Firm*—Howard & Howard Attorneys, P.C.

(57) ABSTRACT

An air-powered vacuum tool for handling multiple workpieces includes vacuum ports formed in a vacuum manifold body and associated air-powered vacuum generators operatively connected with the vacuum manifold body such that each of the vacuum ports is provided with vacuum. Groups of pickup orifices associated with the vacuum ports engage multiple workpieces. Each of the pickup orifices is operatively connected with at least one of the vacuum ports.

17 Claims, 4 Drawing Sheets

AIR-POWERED VACUUM TOOL FOR HANDLING MULTIPLE WORKPIECES

BACKGROUND OF THE INVENTION

1. Field of the Invention

The present invention relates to a material handling tool for simultaneously handling a multitude of workpieces. The tool is powered by vacuum generated within the tool itself.

2. Disclosure Information

The simultaneous processing of multiple workpieces presents interesting design challenges to the designers of material handling machines. These challenges are particularly mettlesome in the case of metallic and nonmetallic containers of the end-consumer types used for soft drinks and other canned and bottled goods. Such containers present a challenge to the designers of automated material handling equipment because the containers must be handled at various points during manufacturing, storage, and distribution, in both in the full and empty states. Needless to say, all handling must be done without crushing or otherwise injuring the containers. Moreover, it is frequently desirable to handle a large number of containers simultaneously so as to increase throughput on a given process line. Although fixed automation has been used to attain this goal, the lack of flexibility in terms of the ability to handle a variety of containers or other workpieces provokes the additional expense of purpose-built machinery.

Vacuum has been used to hold containers and other workpieces to end of arm tools mounted upon robot arms in the past, but such vacuum devices have not generally proven to be satisfactory because known devices generally used a single vacuum source, which if impaired, would render the entire device nonfunctional. Another problem with known vacuum devices resided in the fact that if integrity of the vacuum system were to become impaired, vacuum would be lost for the entire tool, as opposed to a portion of the tool. A tool according to the present invention solves these problems, while providing the flexibility to handle a widely differing array of workpieces, such as single serving beverage containers and packaged good of various sizes.

SUMMARY OF THE INVENTION

An air powered vacuum tool for handling multiple workpieces includes a plurality of vacuum ports formed in a vacuum manifold body, and a plurality of air-powered vacuum generators operatively connected with the vacuum manifold body, such that each of the vacuum ports is provided with vacuum. As used herein, the term "workpiece" means, without limitation, either an object which must be picked up or otherwise moved by a machine, or a food or beverage container, or a grouping of objects, such as containers, and a package containing the grouping.

A plurality of pickup orifices adapted for engaging workpieces is provided in a tool according to the present invention. Each of the pickup orifices is operatively connected with at least one of the vacuum ports. The vacuum ports are formed such that at least some of the ports are not in fluid communication with all others of the ports, and at least one of the vacuum ports is formed such that it is not in fluid communication with any other of the ports. At least one of the vacuum ports is provided with vacuum by a dedicated one of the vacuum generators which provides vacuum only to a single vacuum port. In order to remove the workpieces from the vacuum tool in an expedited manner, at least one common blow-off manifold conducts high pressure air to more than one of the vacuum ports, which serves to expel the workpieces from the vacuum ports.

The present air-powered vacuum tool may be mounted upon a robot such as at the end of a robot arm, or upon a transfer machine. According to another aspect of the present invention, a plurality of vacuum generators is supplied with high pressure air by a plurality of air supply manifolds mounted to a baseplate of the vacuum tool, with the air supply manifolds being isolated so that at least some of the vacuum generators may be powered selectively. This permits groups of vacuum ports to be powered, while others remain unpowered, so as to allow only a portion of the vacuum tool of the present invention to be employed. Thus, the vacuum ports may be divided into a plurality of groupings.

It is an advantage of the present invention that multiple vacuum generators allow the present air-powered vacuum tool to operate satisfactorily even if one or more of the vacuum generators is not functioning properly.

It is another advantage of the present invention that the use of selectively powered vacuum generators allows a portion of the present vacuum tool to be employed without the need of powering the entirety of the vacuum tool.

It is a further advantage of the present invention considerable lifting capacity may be developed without injuring individual workpieces, particularly either empty or full drink containers.

It is another advantage of the present invention that an air-powered vacuum tool may be readily changed over to handle or otherwise accommodate various sizes of containers or other workpieces.

Other advantages, as well as objects and features of the present invention, will become apparent to the reader of this specification.

BRIEF DESCRIPTION OF THE DRAWINGS

FIG. 1 shows a plurality of cartons being carried by the vacuum tool.

DETAILED DESCRIPTION OF THE PREFERRED EMBODIMENTS

Figure 1:
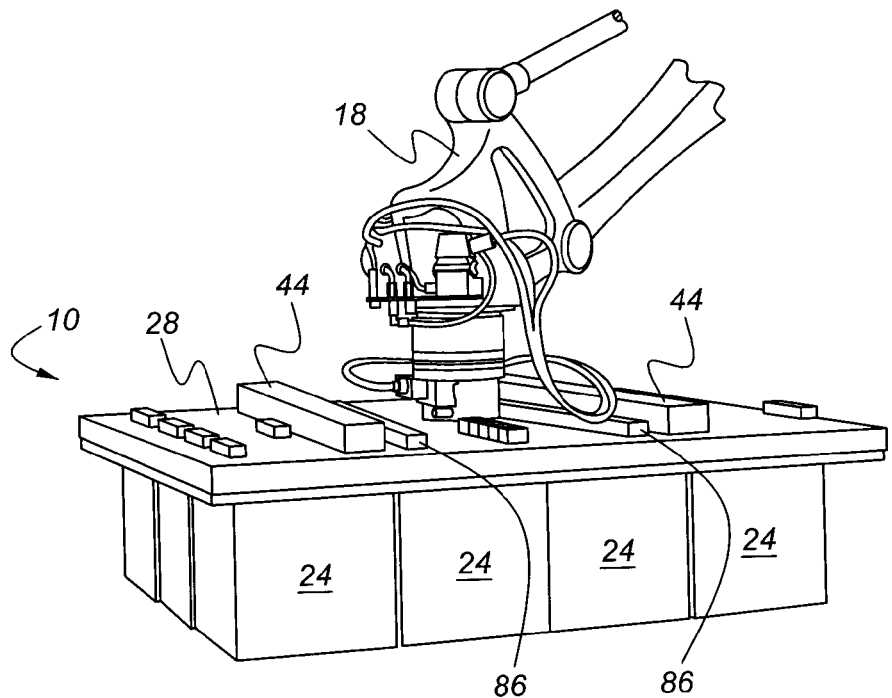
FIG. 1 is a perspective view of an air-powered vacuum tool according to the present invention including a robot arm.
Figure 2:
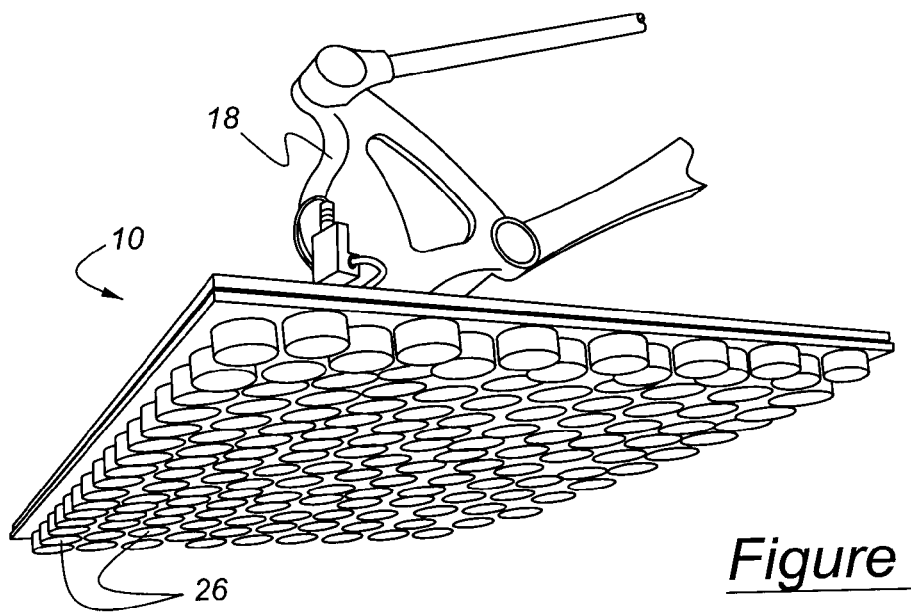
FIG. 2 is a view of the underside of an air-powered vacuum tool according to the present invention showing a plurality of container-type workpieces held thereupon.
Figure 3:
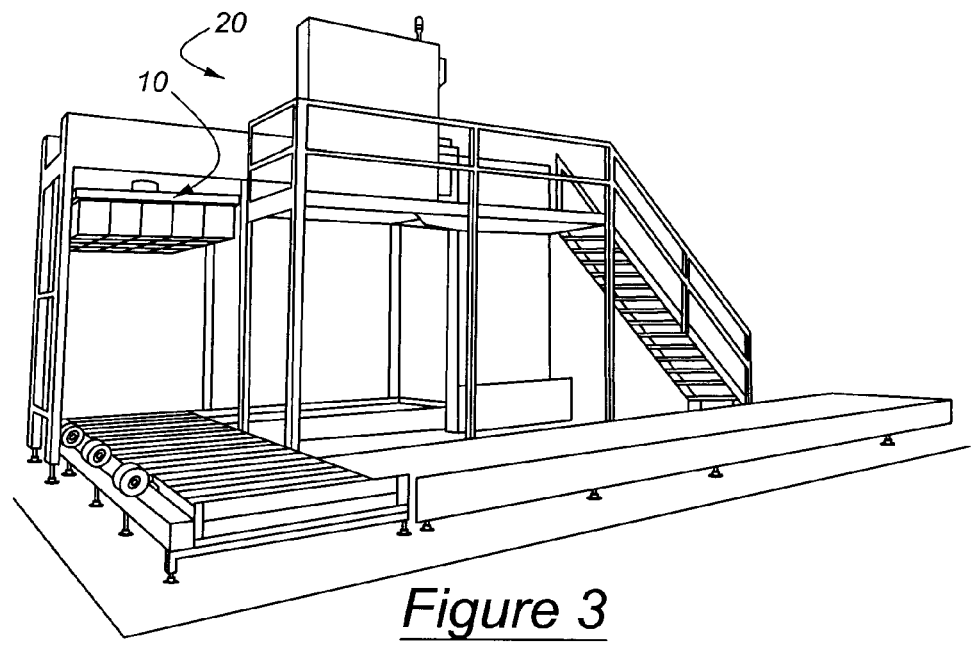
FIG. 3 illustrates a transfer machine having an air-powered vacuum tool according to the present invention.

As shown in FIGS. 1 and 2, air-powered vacuum tool 10 is mounted upon robot arm 18. Thus, the embodiment of FIGS. 1 and 2 is an End of Arm Tool ("EOAT"). Alternatively, as shown in FIG. 3, air-powered vacuum tool 10 may be mounted upon a transfer machine, 20. FIG. 1 shows air-powered vacuum tool 10 as having a plurality of cartons 24 attached by vacuum thereto, whereas FIG. 2 shows a plurality of containers 26 or other workpieces attached thereto. An air-powered vacuum tool according to the present invention has been successfully tested with 580 soft drink cans accommodated on a vacuum tool having an overall dimension of about 56 ins. by 68 ins.

FIG. 1 also shows that various components of air-powered vacuum tool 10 are mounted upon an upper portion of baseplate 28. In essence, baseplate 28 functions as a platform upon which various other components of the present air-powered vacuum tool may be mounted.

Moving now to FIG. 6, the overall architecture of the present air-powered vacuum tool will be discussed. At the center of the air-powered vacuum tool 10, mounting flange 16 provides a structure for attaching the air-powered vacuum tool to a robot, or transfer machine, or other device. Workpiece stabilizers 90 are provided at opposite ends of baseplate 28. The purpose of workpiece stabilizers 90 is to engage stray workpieces during and immediately following a blowoff or disengagement of workpieces from vacuum tool 10. Each of workpiece stabilizers 90 includes a rod-like element 90a which is pivotably attached to baseplate 28 such that elements 90a maybe swung down to prevent loose workpieces from toppling over when they are released from vacuum tool 10.

Figure 6:
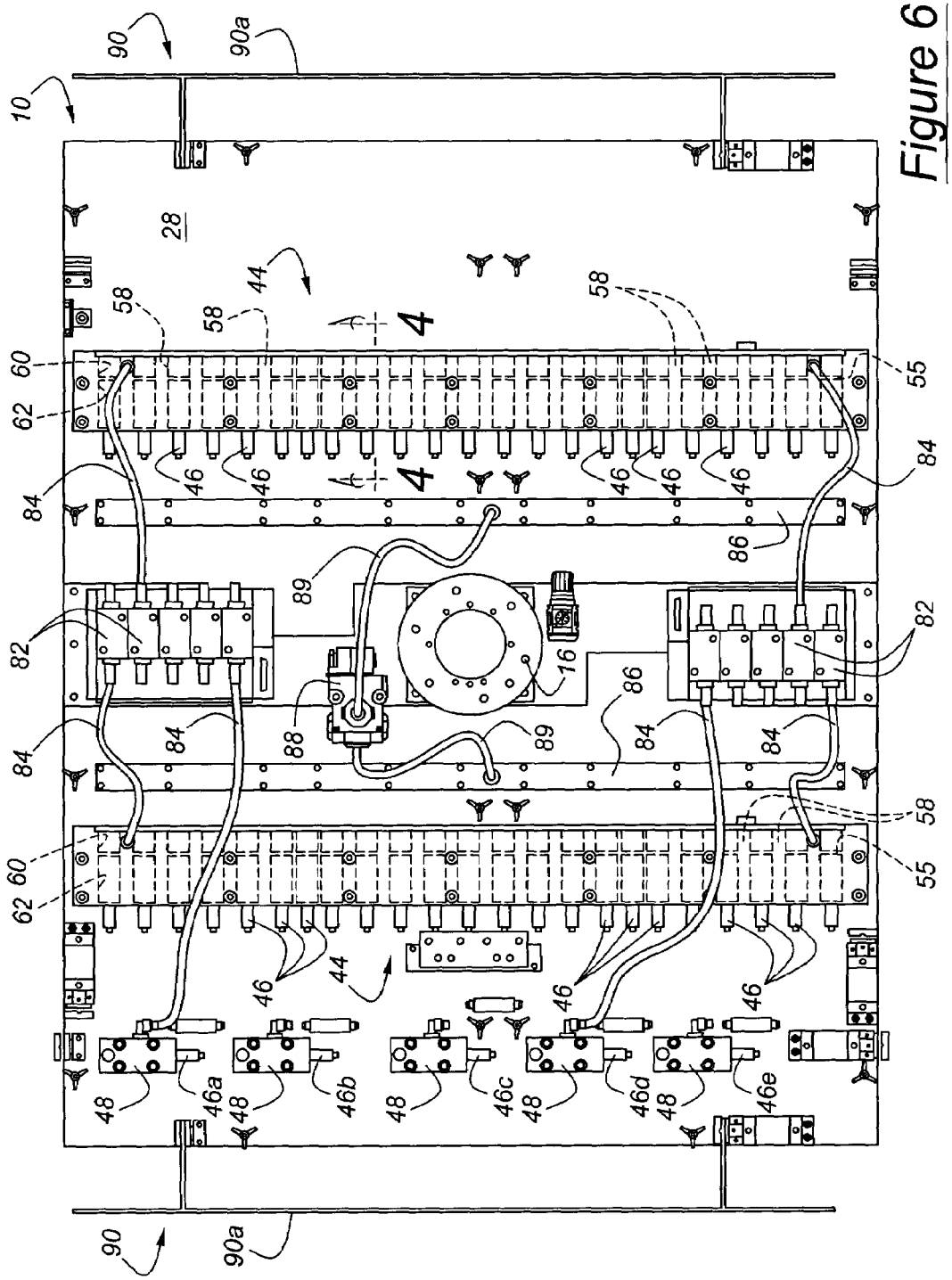
FIG. 6 is a plan view of the upper portion of an air-powered vacuum tool according to the present invention.

FIG. 6 shows many additional details of a configuration of an exemplary air-powered vacuum tool for handling multiple workpieces according to the present invention. In order to generate the required vacuum, high pressure air having a pressure in the range of 45 to 90 psi is provided by solenoid air supply valves 82, which are electrically controlled, and which send air through a plurality of air lines 84 to multiple air supply manifolds 44.

Air supply manifolds 44 extend laterally across baseplate 28 and are divided both longitudinally and laterally. A longitudinally extending bulkhead, 55, divides each of air supply manifolds 44 into an air supply port, 60, and a vacuum plenum, 62. This is shown with particularity in upper most portion of FIG. 4, which also shows a vacuum generator 46. The plurality of vacuum generators 46 shown in FIG. 6 receives high pressure air from air supply port 60. The supply air passes through a vacuum venturi section 54 of each vacuum generator 46, wherein a vacuum is formed. This then pulls a vacuum on vacuum plenum 62. Thereafter, the air exits from vacuum generators 46 via outlets 56. The inventors of the present invention have determined that an air-powered, venturi vacuum generator sold under the brand name "PIAB" and having a model designation PI12-13 is satisfactory for use in an air-powered vacuum tool according to the present invention.

Figure 4:
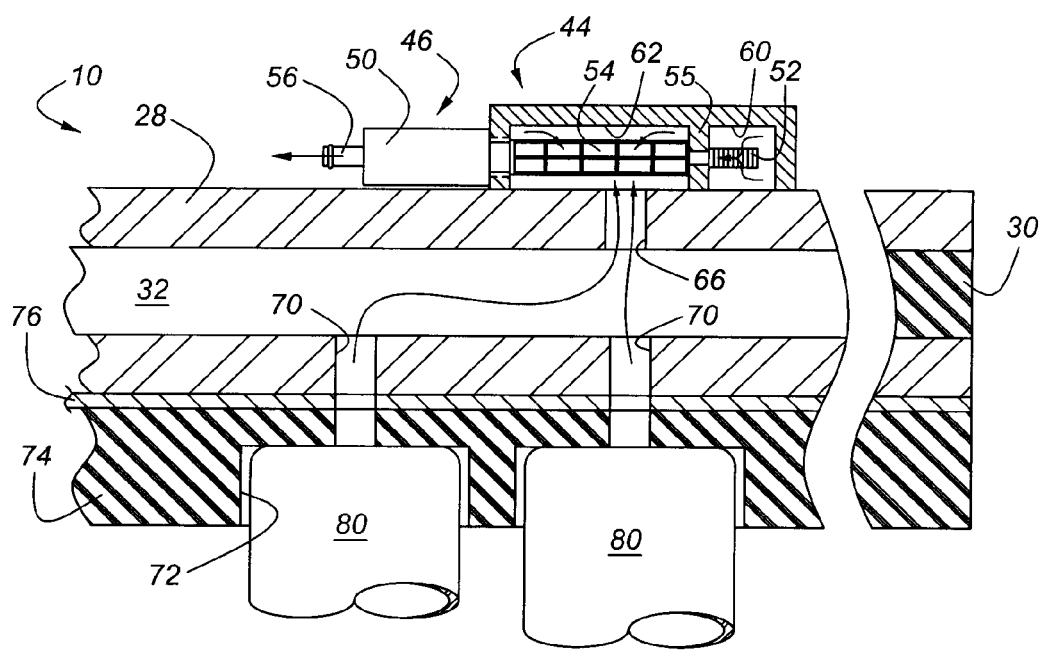
FIG. 4 is a sectional view through a portion of the base and underlying structure of the air-powered vacuum tool shown in FIGS. 1-3.

As is further shown in FIG. 4, vacuum plenum 62 communicates by vacuum transfer passages 66 to vacuum ports 32 which are formed in vacuum manifold body 30. The vacuum manifold body, 30, is abuttingly attached to the underside of baseplate 28. Vacuum within vacuum ports 32 is communicated by means of a plurality of vacuum supply passages 70 to a plurality of pickup orifices 72. The pickup orifices are formed within workpiece interface plate 74 which is attached to the underside of baseplate 76. It has been determined the by the inventors of the present invention that the workplace interface plate 74 may be advantageously formed by high pressure water jet forming of an elastomeric plate. Pickup orifices 72 are shown as engaging cylindrical workpieces 80, which may, for example, be either cylindrical containers, or bottle caps, or other cylindrical items. Because pickup orifices 72 are easily formed by cutting of workpiece interface plate 74, the sizes and shapes of pickup orifices 72 may readily be changed to accommodate workpieces having a variety of sizes, shapes, and weights.

Figure 5:
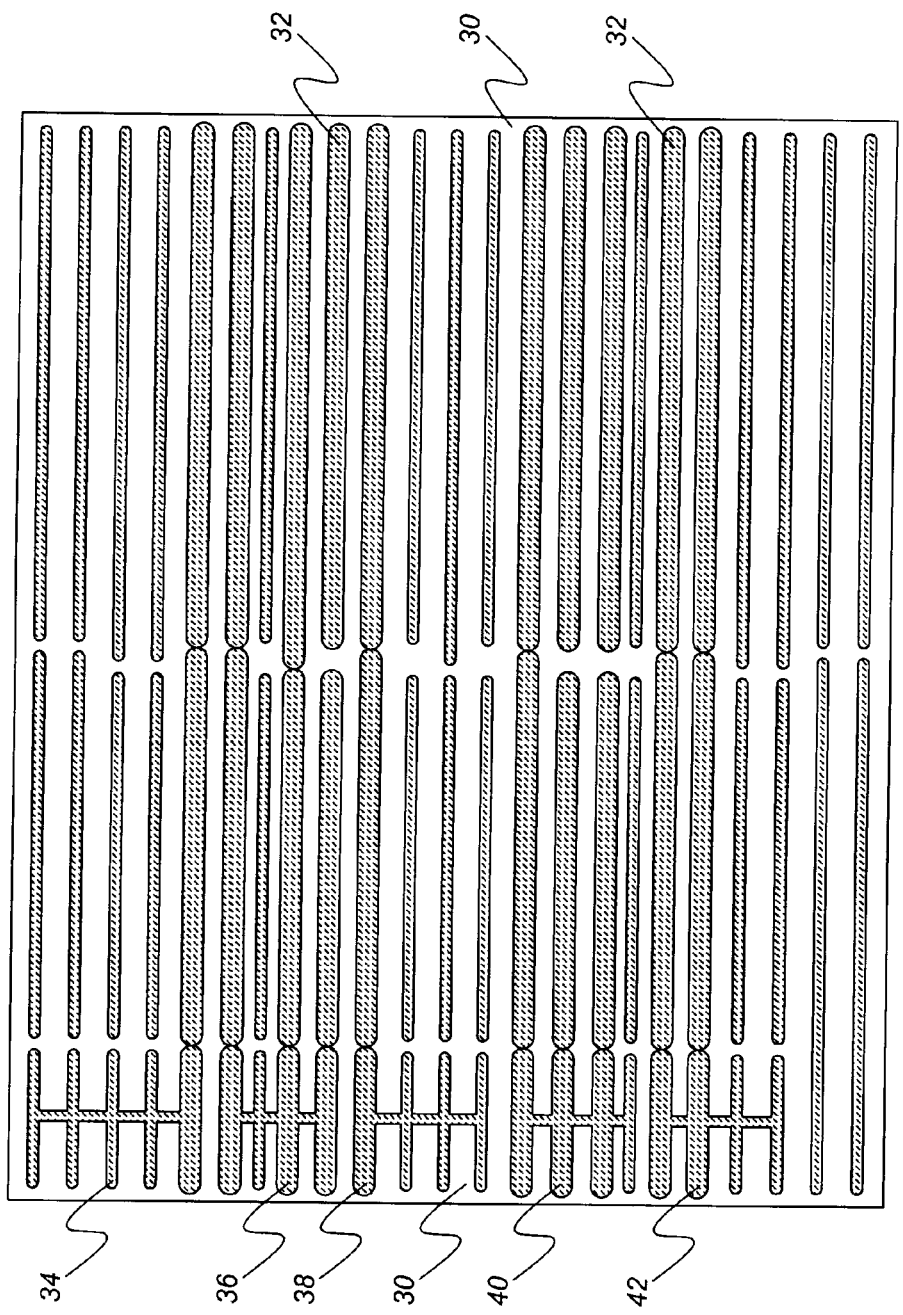
FIG. 5 illustrates a vacuum manifold body having a plurality of vacuum ports formed therein according to an aspect of the present invention.

Returning now to FIG. 6, and specifically with reference to air supply manifold 44, it is seen that each of air supply manifolds 44 has a plurality of laterally extending bulkheads 58, which serve to isolate portion of air supply manifolds 44. As seen from FIG. 5, some of vacuum ports 32 formed in vacuum manifold body 30 are not interconnected and because of the use of bulkheads 58, at least some of vacuum generators 46 may be dedicated to individual ones of vacuum ports 32. This allows a tool according to the present invention to continue in operation if some of the vacuum generators become impaired or otherwise deactivated. For example, groupings of vacuum ports are shown at 34, 36, 38, 40 and 42, of FIG. 5. Each of vacuum port groupings 34-42 are independently controlled by means of air valves 46a-e shown in FIG. 6. Thus, if vacuum port groups 34-42 are not needed, vacuum generators 46a, b, c, d and e may be shut off from the tool's air supply by de-energizing appropriate solenoid air supply valve 82. As noted above, vacuum manifold body 30 may advantageously be formed from elastomeric material which is water jet cut in the form illustrated in FIG. 5.

FIG. 6 additionally shows a pair of blow-off manifolds 86 which are fed by blow-off control valve 88. Valve 88 is attached to a source of high pressure compressed air (not shown), and feeds air through lines 89 to blow-off manifolds 86. Blow-off manifolds 86 are in communication with all of vacuum ports 32-42, and when valve 88 is opened, the resulting rush of high pressure air will forcibly remove any workpieces which are resident in pickup orifices 72 of workpiece interface plate 74. In this manner, workpiece interface plate 74 and pickup orifices 72 may be constructed so as to robustly engage workpieces, without having workpieces undesirably "hung up" or retained to interface plate 74 once tool 10 has come to a desired end location and all vacuum generators 46 have been shut off by means of air valves 82.

An air-powered vacuum tool according to the present invention offers a significant advantage in terms of flexibility, as compared with fixed tooling, inasmuch as the configuration of the present tool, in terms of its capability to pick up objects of varying sizes, weights and numbers, may be easily changed by removing and replacing base 76 and workpiece interface plate 74.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An air-powered vacuum tool for handling a plurality of workpieces, comprising:
    a baseplate;
    a vacuum manifold body mounted to an underside of said baseplate, with said manifold body having a plurality of vacuum parts formed therein;
    a plurality of air-powered vacuum generators mounted to an upper surface of said baseplate, with said vacuum generators being operatively connected with said vacuum manifold body, such that each of said vacuum ports is provided with vacuum generated by at least one dedicated vacuum generator;
    a plurality of pickup orifices adapted for engaging workpieces, with said pickup orifices being formed in a removable workpiece interface plate attached to an underside of said vacuum manifold body, with each of said pickup orifices being operatively connected with at least one of said vacuum ports; and a blowoff system adapted to conduct high pressure air to each of said vacuum ports, so as to separate workpieces from said pickup orifices.

2. An air-powered vacuum tool for handling multiple workpieces according to claim 1, wherein said workpiece interface plate comprises an elastomeric plate having said plurality of pickup orifices formed therein.

3. An air-powered vacuum tool according to claim 1, further comprising a plurality of air-powered outboard workpiece stabilizers adapted to engage stray workpieces following a blowoff.

4. An air-powered vacuum tool according to claim 1, wherein said at least one of said plurality of air-powered vacuum generators comprises a venture vacuum generator.

5. An air-powered vacuum tool according to claim 1, wherein at least some of said vacuum ports are isolated from the remaining ones of said vacuum ports.

6. An air-powered vacuum tool according to claim 1, wherein said plurality of vacuum ports is divided into a plurality of vacuum port groupings.

7. An air-powered vacuum tool according to claim 1, further comprising a robot arm attached to said baseplate for positioning said vacuum tool.

8. An air-powered vacuum tool according to claim 1, further comprising a transfer machine attached to said baseplate, for positioning said vacuum tool.

9. An air-powered vacuum tool according to claim 1, wherein said blowoff system is adapted to conduct high pressure air to each of said vacuum ports simultaneously.

10. An air-powered vacuum tool according to claim 1, wherein said workpieces comprise liquid tight containers.

11. An air-powered vacuum tool according to claim 1, wherein said workpieces comprise cartons continuing a plurality of items.

12. An air-powered vacuum tool for handling a plurality of workpieces, comprising:

a baseplate;

a vacuum manifold body mounted to an underside of said baseplate, with said manifold body having a plurality of vacuum ports formed therein;

a plurality of air-powered vacuum generators mounted to an upper surface of said baseplate, with said vacuum generators being operatively connected with said vacuum manifold body, such that each of said vacuum ports is provided with vacuum generated by at least one dedicated vacuum generator, wherein said plurality of vacuum generators is supplied with high pressure air by a plurality of air supply manifolds mounted to said baseplate, with said air supply manifolds being isolated such that at least some of said vacuum generators may be powered selectively;

a plurality of pickup orifices adapted for engaging workpieces, with said pickup orifices being formed in a removable workpiece interface plate attached to an underside of said vacuum manifold body, with each of said pickup orifices being operatively connected with at least one of said vacuum ports; and a blowoff system adapted to conduct high pressure air to each of said vacuum ports, so as to separate workpieces from said pickup orifices.

13. An air-powered vacuum tool in accordance with claim 12, wherein said plurality of air supply manifolds is provided with high pressure air controlled by a plurality of air valves mounted upon said baseplate.

14. An air-powered vacuum tool for handling a plurality of workpieces, comprising:

a baseplate;

a vacuum manifold body mounted to an underside of said baseplate, with said manifold body having a plurality of vacuum ports formed therein;

a plurality of air-powered vacuum generators mounted to an upper surface of said baseplate, with said vacuum generators being operatively connected with said vacuum manifold body, such that each of said vacuum ports is provided with vacuum generated by at least one of said plurality of vacuum generators;

a plurality of pickup orifices adapted for engaging workpieces, with said pickup orifices being formed in a removable workpiece interface plate attached to an underside of said vacuum manifold body, with each of said pickup orifices being operatively connected with at least one of said vacuum ports.

15. An air-powered vacuum tool according to claim 14, further comprising a blowoff system adapted to conduct high pressure air to each of said vacuum ports, so as to separate workpieces from said pickup orifices.

16. An air-powered vacuum tool according to claim 14 wherein at least one of said vacuum ports is formed such that it is not in fluid communication with any other of said ports.

17. An air-powered vacuum tool according to claim 14 wherein at least one of said vacuum ports is provided with vacuum by a dedicated one of said vacuum generators providing vacuum to only said at least one vacuum port.

* * * * *

UNITED STATES PATENT AND TRADEMARK OFFICE
CERTIFICATE OF CORRECTION

PATENT NO. : 7,296,834 B2
APPLICATION NO. : 10/711942
DATED : November 20, 2007
INVENTOR(S) : Jeffrey A. Clark et al.

It is certified that error appears in the above-identified patent and that said Letters Patent is hereby corrected as shown below:

Column 5, line 35, please delete "continuing" and replace with --containing--.

Signed and Sealed this

Sixth Day of May, 2008

JON W. DUDAS
*Director of the United States Patent and Trademark Office*